US006831931B2

(12) United States Patent
Coupe et al.

(10) Patent No.: US 6,831,931 B2
(45) Date of Patent: Dec. 14, 2004

(54) SYSTEM AND METHOD FOR REMULTIPLEXING OF A FILTERED TRANSPORT STREAM

(75) Inventors: David Coupe, Gex (FR); Eric M. Foster, Owego, NY (US); Bryan J. Lloyd, Vestal, NY (US); Chuck H. Ngai, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 09/730,636

(22) Filed: Dec. 6, 2000

(65) Prior Publication Data

US 2002/0067745 A1 Jun. 6, 2002

(51) Int. Cl.[7] .................................................. H04J 3/02
(52) U.S. Cl. ...................................................... 370/535
(58) Field of Search ................................. 370/535, 536, 370/537, 538, 540, 542, 394, 412, 465, 528

(56) References Cited

U.S. PATENT DOCUMENTS

| | | | |
|---|---|---|---|
| 5,619,337 A | * | 4/1997 | Naimpally .................... 386/83 |
| 5,650,825 A | | 7/1997 | Naimpally et al. |
| 5,691,986 A | | 11/1997 | Pearlstein |
| 5,844,478 A | | 12/1998 | Blatter et al. |
| 5,914,962 A | * | 6/1999 | Fimoff et al. ................ 370/538 |
| 6,002,687 A | | 12/1999 | Magee et al. |
| 6,064,676 A | | 5/2000 | Slattery et al. |
| 6,181,706 B1 | * | 1/2001 | Anderson et al. ............ 370/412 |
| 6,229,801 B1 | * | 5/2001 | Anderson et al. ............ 370/349 |
| 6,275,507 B1 | * | 8/2001 | Anderson et al. ............ 370/487 |
| 6,356,567 B2 | * | 3/2002 | Anderson et al. ............ 370/516 |
| 6,421,359 B1 | * | 7/2002 | Bennett et al. ............... 370/538 |
| 6,434,146 B1 | * | 8/2002 | Movshovich et al. ........ 370/394 |
| 6,501,770 B2 | * | 12/2002 | Arsenault et al. ............ 370/477 |
| 6,621,817 B1 | * | 9/2003 | Chauvel ....................... 370/389 |
| 6,643,298 B1 | * | 11/2003 | Brunheroto et al. ......... 370/537 |
| 6,662,329 B1 | * | 12/2003 | Foster et al. ................. 714/747 |

FOREIGN PATENT DOCUMENTS

| | | |
|---|---|---|
| WO | WO 98/16067 | 4/1998 |
| WO | WO 99/23830 | 5/1999 |

* cited by examiner

Primary Examiner—Min Jung
(74) Attorney, Agent, or Firm—Scully, Scott, Murphy & Presser; William H. Steinberg, Esq.

(57) ABSTRACT

A transport demultiplexor system and queue remultiplexing methodology includes: a packet buffer for receiving data packets belonging to an input transport stream, each packet having a corresponding identifier identifying a program to which the packet belongs; a data unloader device for pulling successive packets from the packet buffer for storage in a memory storage device, and writing the pulled packets into contiguous address locations in the memory; and, a remultiplexor mechanism for generating an address offset associated with a next data packet pulled from the packet buffer to be stored in memory and writing it to a new memory location that is offset from a memory location assigned to a previously pulled packet, the offset defining a memory gap in the memory storage device capable of being filled new data content.

25 Claims, 3 Drawing Sheets

SYSTEM AND METHOD FOR REMULTIPLEXING OF A FILTERED TRANSPORT STREAM

BACKGROUND OF THE INVENTION

1. Field of the Invention

This invention relates generally to digital delivery systems, especially for digital video and digital audio data, and more specifically, to a transport stream demultiplexor system including packet remultiplexing function.

2. Discussion of the Prior Art

In an MPEG subsystem that receives content in transport stream format, a transport demultiplexor is used to separate the arriving stream into audio, video, and system data streams. The video data is sent to the video decoder, the audio data to the audio decoder, and the system data to system memory for further processing. In a set-top box application, this allows the program selected by the viewer to be separated and played.

Increasingly, there is a need to be able to store selected program(s) to a fixed storage device such as a hard drive for playback in the set-top box. This requires sending all data associated with the program; audio, video, and system data, to memory for subsequent transfer to the hard drive or other device.

Previously, we have disclosed techniques for storing and playing data based on using the PES, or Packetized Elementary Stream, format which allows for efficient content movement as described in commonly-owned, co-pending U.S. patent application Ser. Nos. 09/534643 and 09/535069, and in issued U.S. Pat. No. 6,662,329 the contents and disclosure of each of which are incorporated by reference herein.

However, an alternative of interest to system designers is to store the data in its original transport stream format, but filtering out packets that are not related to the program of interest. When doing this, it may be necessary to insert additional packets containing further information into the partial transport stream as it is being stored to allow subsequent playback. In fact, the ability to id add information to a stored stream may be generally used to add or modify stream information for a variety of purposes.

It would thus be highly desirable to provide an improved technique for adding new or additional packets to be inserted into a program streams to allow later playback.

Current techniques for adding new information require streaming the data into memory and then copying the data over to another location while inserting the new data as it is being copied which is inefficient in terms of both having to do a double move and consuming additional memory space. Thus, it would be further highly desirable to provide an improved technique for adding new or additional packets to be inserted into a program stream in a single pass.

SUMMARY OF THE INVENTION

It is an object of the present invention to provide in a digital data transport demultiplexor, a system and method for remultiplexing, i.e., inserting, packets including new content with a filtered transport stream as it is being stored to memory.

According to the invention, there is provided a transport demultiplexor system and queue remultiplexing methodology comprising: a) packet buffer for receiving data packets belonging to an input transport stream, each packet having a corresponding identifier identifying a program to which the packet belongs; b) a data unloader device for pulling successive packets from the packet buffer for storage in a memory storage device, and writing the pulled packets into contiguous address locations in the memory; c) a remultiplexor mechanism for generating an address offset associated with a next data packet pulled from the packet buffer to be stored in memory and writing it to a new memory location that is offset from a memory location assigned to a previously pulled packet, the offset defining a memory gap in the memory storage device capable of being filled new data content.

Advantageously, such a system and method is adapted for processing MPEG-2-compliant digital transport streams, however, may be applicable to other types of digital data communications.

BRIEF DESCRIPTION OF THE DRAWINGS

Further features, aspects and advantages of the apparatus and methods of the present invention will become better understood with regard to the following description, appended claims, and the accompanying drawing where:

DETAILED DESCRIPTION OF THE PREFERRED EMBODIMENTS

According to the invention, there is provided a technique for inserting, or remultiplexing, packets containing new content with a filtered transport stream as it is being stored to memory for subsequent filing on a fixed storage device. The technique is based on a modification to the existing transport demultiplexor as described in U.S. Pat. No. 6,275, 507 entitled TRANSPORT DEMULTIPLEXOR FOR AN MPEG-2 COMPLIANT DATA STREAM the contents and disclosure of which is incorporated by reference as if fully set forth herein.

Figure 1:
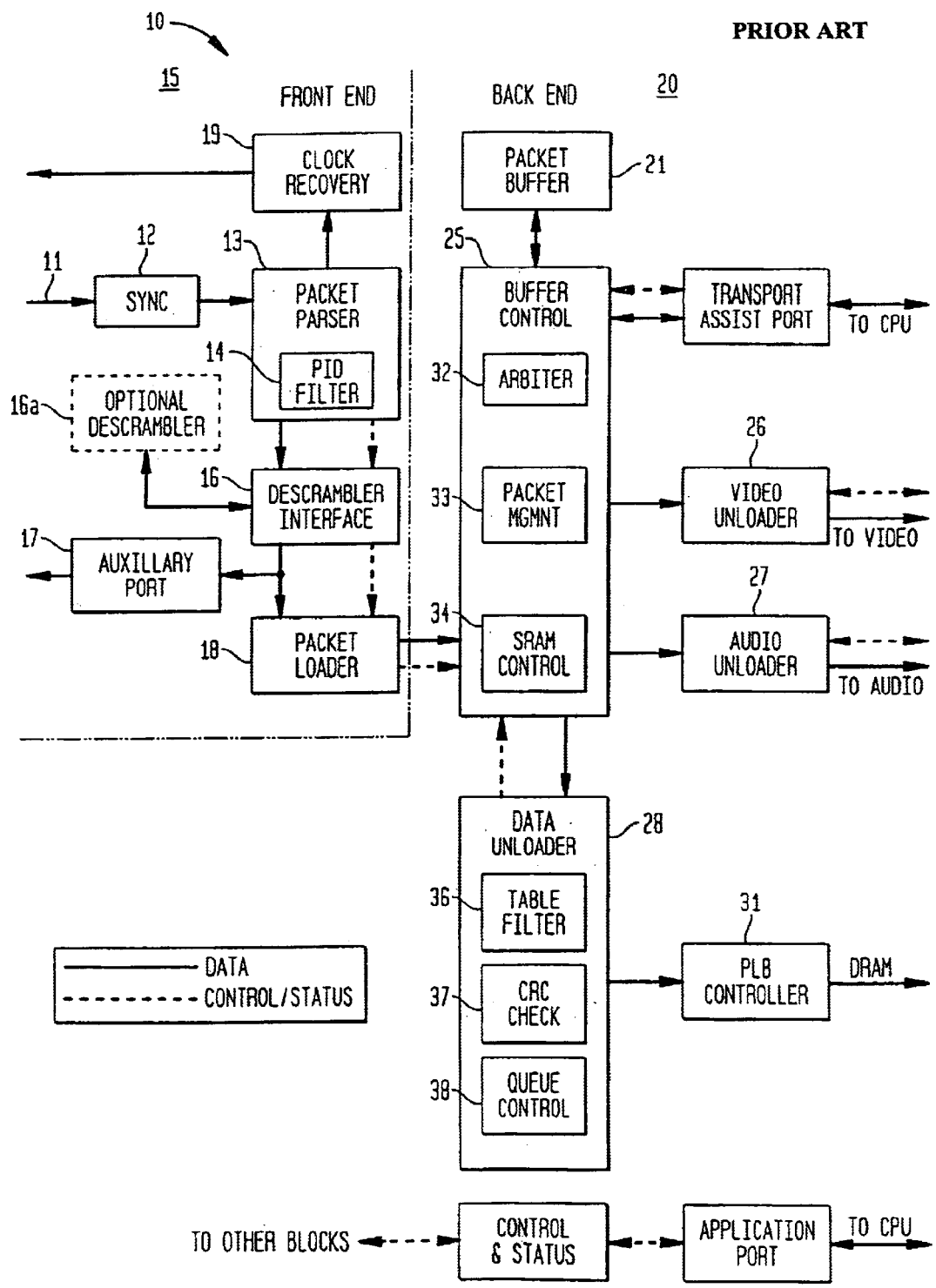
FIG. 1 is a block diagram illustrating the transport demultiplexor 10 adapted for demultiplexing an MPEG-2-compliant transport stream into a system data stream, a video data stream, and an audio data stream.

Particularly, the demultiplexor described in U.S. Pat. No. 6,275,507 is a transport demultiplexor that is adapted for demultiplexing an MPEG-2-compliant transport stream into system data streams, a video data stream, and an audio data stream particularly, by extracting program clock references (PCRs) from the data stream and filtering out unnecessary components through the use of Packet Ids (PIDs). As shown in FIG. 1, the transport demultiplexor 10 includes front end logic 15, back-end logic 20, and including a packet buffer 21, control circuit 25, and data unloader 28, video unloader 26, and audio unloader 27 elements. Generally, the front end logic 15 receives transport stream input packets, and delivers the transport stream packets to the packet buffer 21. The packet buffer 21, in turn, delivers system data to the system data unloader 28, video data to the video unloader 26, and audio data to the audio unloader 27 each of which, as will be explained, asynchronously pull packets out of the packet buffer.

A typical system incorporating the transport demultiplexor of the invention includes a front-end demodulator device (not shown) that converts a received analog signal (e.g., from a satellite broadcast), into a multiplexed digital data (transport) stream which arrives at an input port 11 as 188 byte packets, each packet having a repeating character that may be used for synchronizing packet boundaries. This synchronization is performed by a synchronizer device 12 which receives the 188 byte packet input. Once the packet boundaries are known, the packets are input to the packet parser device 13 which looks at the different data fields within a packet header. As known, the packet header includes a packet identifier, i.e., a PID, which is used to reassemble the original components of the stream of data, i.e., video, audio, etc. Included in the packet parser 13 is a PID filter 14 which functions to filter out the unnecessary packets from the input multiplex stream and pass through only those packets associated with the desired data, e.g., video or audio program, for example. Additionally, the packet parser extracts program clock references (PCRs) and sends them to a clock recovery unit 19 for reconstructing a System Time Clock (STC). From the PID filter 14, the desired packets may be optionally input via interface 16 to a descrambler device 16a which may be implemented for conditional access reasons. The data may then be transferred to an auxiliary port 17 for exit as a real-time stream, i.e., the data that arrives at the front end 15 leaves the front end at the same rate. The difference however, is that the output is reduced to only the packets that are of interest. The output stream is additionally input to a packet loader device 18 which transports the packets through a buffer control device 25 for loading into a packet buffer 21, which may be a ten (10) packet bucket, for example. As mentioned, the PID filter 14 enables retention of only the packets of interest however, this data has not been separated. Preferably, a key word or an information word has been is associated with each packet which identifies the packet as either audio, video or data headed for system memory. Thus, loaded into the packet buffer are all the packets of interest with each packet having an information word appended thereto indicating the payload and dictating the subsequent processing to be performed by the unloaders.

With more particularity, as shown in FIG. 1, the buffer control device 25 has only one input and output port. Thus, an arbiter device 32 is provided to coordinate the packet loading operation and the three packet unloading operations performed by the unloader devices. Further included, is a packet manager device 33 which enables control over the total number of packets. For example, when the video unloader requests more data, it has to know where the next video packet is located given that there may be ten available slots in the bucket 21. Although the data all goes in mixed together, the packet manager device 33 has to keep track of where the video packets are, the audio packets and the system data packets. Additionally included is an SRAM control device 34 which generates control lines such as read/write lines, etc.

After loading data into the packet buffer, and, upon receipt of an audio/video program request, the specific audio and video data may be pulled out by the respective audio and video unloaders for input to decode devices (not shown) where the data is decompressed and assembled for viewing on the subscriber's television, for example, or stored in a memory for later playback. That is, on an arbitrated basis, the unloaders access the packet buffer, read the information word, and send the packet to its correct destination.

The data unloader device 28 does not have a request line (does not receive requests) as it functions to actually push system data out to the memory as it receives it. The PLB (Processor Local Bus) I/F controller device 31 that is called out, is essentially a bus controller that takes control of the bus inside the chip and sends the data to system memory. Thus, the data unloader 28 operates in conjunction with the PLB controller, for example, when there is data included in the packet buffer that needs to go to system memory. The data unloader 28 will pull that data out, perform some processing, and then send it off to the PLB controller who will, in turn, send it off to memory. As known, the types of system data that is stored in memory includes, but is not limited to, the following types of data: navigation data, e.g., data that instructs how to retrieve the different packet Ids for video or audio; conditional access data, e.g., data information that instructs how to obtain entitlement to watch a particular program that a subscriber is interested in; and, general data, e.g., software downloads, or, teletext information, for example, that would be viewed across the bottom of the viewer screen, etc.

As further shown in FIG. 1, the data unloader device 28 further includes table filters 36, CRC checkers 37, and queue controller devices 38. Particularly, the data unloader queue control block 38 ensures that as it is sending data for a given packet type, it will send all that data to memory and keep track of the read/write pointers so that it is loaded into the buffer correctly. The CRC check 37 provides optional cyclical redundancy checking (CRC) results on some types of data that are sent; and, the table filter block 36 provides a way of filtering some types of data that are often sent and actually provides sub-filtering. For example, although packets have been retained associated with a particular packet ID, it may still be desirable to discard some other types of data packet associated with that packet ID. While the demultiplexor generally sends each packet type (as listed by the packet ID (PID)) to a separate queue in memory (not shown), it can be configured to send a group of packet types, or PIDs, to a single "bucket queue". Thus, a subset of the original transport stream may be stored in a single streaming buffer. As an analogy, the original stream may comprise several programs multiplexed together each of which is in turn comprised of multiple components such as audio, video, etc., and the output may be a multiplex that may be associated with only one program that is desired to be viewed by a subscriber but is still comprised of multiple components. Thus, for example, if the original multiplex has programs from three (3) different networks, with each program consisting of audio data, video data and navigation data, and these are processed by the transport demultiplexor 10, one program for one network may be put in the bucket queue memory which will comprises audio data, video data and navigation data associated only with that program. That is, the special controls in the data loader and the buffer control enable that the video, audio and system data to be stored is together in one place, the "bucket queue", rather than separate places. As the "bucket queue" is the most commonly used queue for performing Insertions, it is understood that the queue remultiplexor function described herein is not limited to systems implementing the bucket queue.

Figure 2:
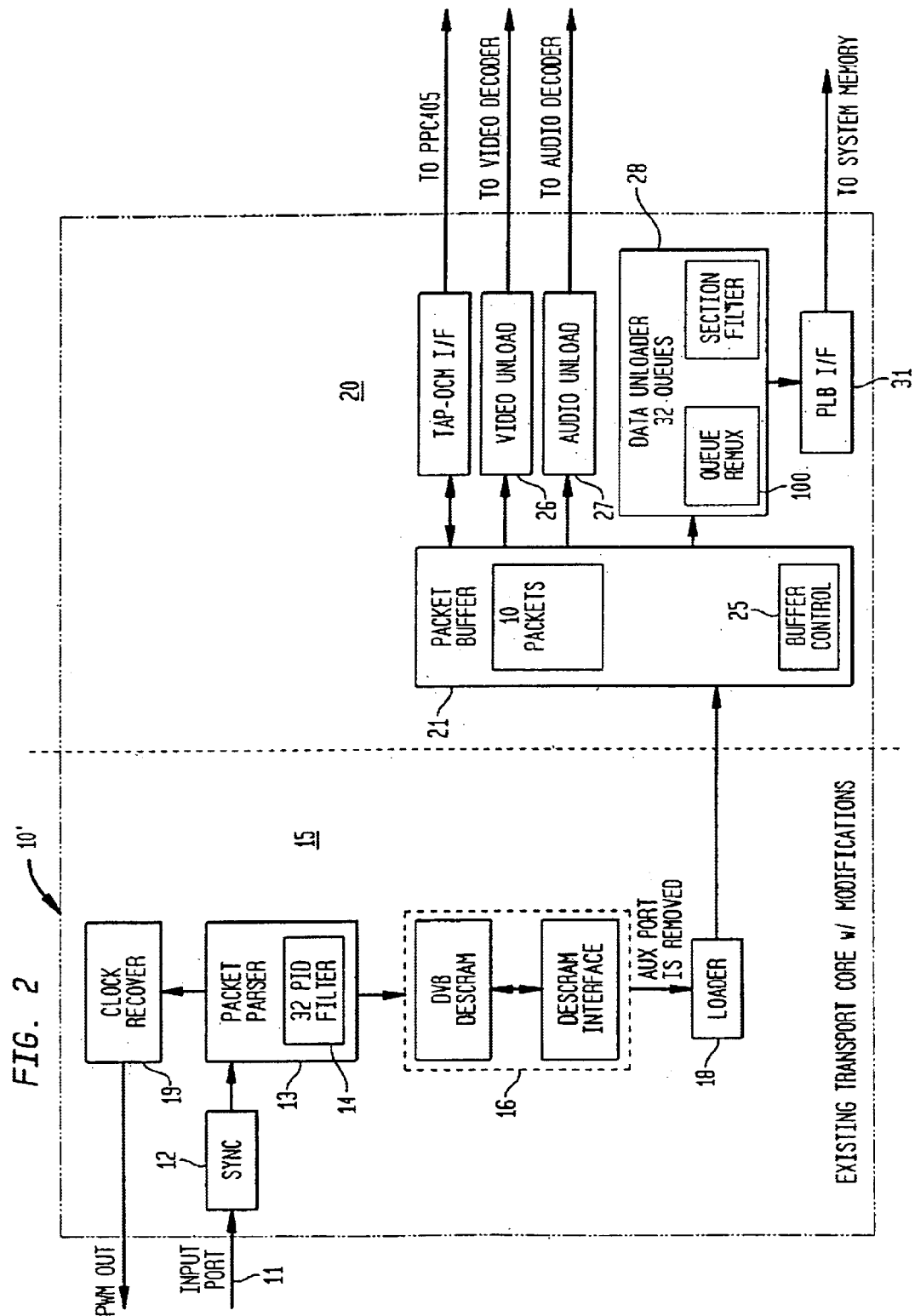
FIG. 2 illustrates the transport demultiplexor of FIG. 1, amended in accordance with the principles of the invention to provide a queue remultiplexor component 100 which performs a packet insertion function.

In accordance with the invention, re-multiplexing is the concept of taking a sub-set of the program, and actually adding new content to it. FIG. 2 illustrates the transport demultiplexor 10' of FIG. 1, amended in accordance with the principles of the invention, to provide a queue remux component 100 which performs a packet insertion function enabling new information to be inserted that was not in the original stream. As shown in FIG. 2, this queue remux component 100 is provided as part of the data unloader module 28. As further shown in FIG. 2, the transport demultiplexor system has the capability of unloading data into 32 queues in the memory. Thus, as will be explained, the insertion of new data content is possible for any of the 32 queues in the transport.

Figure 3:
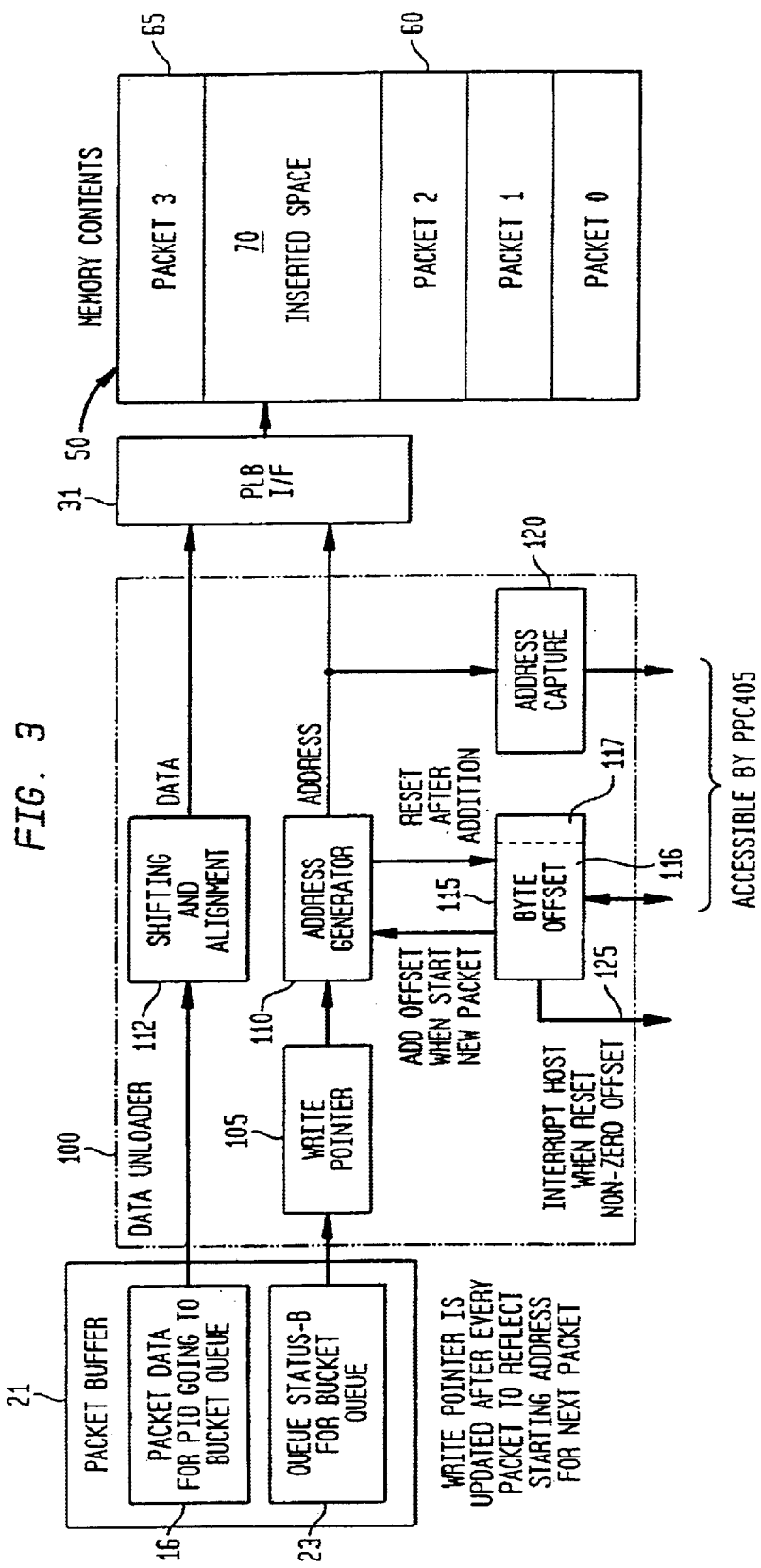
FIG. 3 illustrates a detailed block diagram depicting the data flow operations for the unloader device 28 and queue remux component 100 according to the invention.

FIG. 3 illustrates in greater detail the data unloader circuit 28 and queue remux component 100. As shown in FIG. 3, the packet data 16 for the PIDs destined for the bucket queue 50 are stored in the packet buffer 21. The queue "Status-B" represents the write pointer 23 for the queue targeted for insertion, i.e., an address tag, for input to the PLB interface 31, for indicating where in the queue 50 residing in memory each piece of data is going to be written to. Typically, the write pointer for each queue is updated after every time a packet destined for that queue is put in the memory 50. Thus, during normal data unload operations, the data unloader 28 pulls the write pointer address 105 from the bucket and, via the address generator block 110, will perform address generation for the next packet pulled. For example, given three packets numbered 1, 2 and 3 destined for the same queue in memory and assuming the memory address for that queue for PID 1 commences at queue address 0, then when the very first packet PID 1 shows up, the queue status B is going to have a write pointer indicating an address 0. The address generator 110 generates addresses from 0 through 187 bytes for each byte of a packet that is written out. Thus, byte 1 gets written out with address 0; byte 2 gets written out with address 1, and so on.

When the whole packet PID 1 is written out, the queue status-B pointer 23 will indicate an address value of 188 indicating where the first byte of the next packet PID 2 will start, etc. Further provided in the data unloader component 28 of FIG. 3, is a shifting and alignment block 112 which functions to look at the data and align it for attachment to the bucket memory correctly. This may be necessary when a packet is 188 bytes and the bucket queue memory may be set up on a 4 byte interface, for example.

In accordance with a preferred embodiment of the invention, the address generator functionality is modified to provide the queue remux function 100 for transport stream demultiplexor 10'. That is, in the preferred embodiment, a control is provisioned in the data unloader 28 that enables insertion of a programmable number of bytes for insertion between the last packet unloaded from the packet buffer and placed in memory location 60 in the bucket queue 50, shown in FIG. 3, and the next successive unloaded packet to be placed in memory location 65 in the bucket queue. For example, the address generator 110 may configured to add a programmable number of bytes to the next address (write pointer) so that the data stored in memory will be offset for that programmed amount of bytes. The original data of the stream would then start incrementing from the new address location and the resulting offset memory area 70 in the bucket queue would be available for new data. Once that space or gap 70 is available, the CPU may subsequently write new data content therein.

Specifically, the queue remux component 100 comprises an offset register 115 having a byte offset value 116, and a bit indicator 117 that are set by the programmer to indicate that an insertion is to be made. The bit indicator 117 is initialized to zero in the normal course of data writing to memory when no data is to be inserted. Then, when it is desired to insert a number of bytes of data, the CPU writes a corresponding non-zero offset value 116 to the offset register 115 and sets the indicator bit 117, which initiates adding of the byte offset value to the write pointer address 105 to create the offset (gap) in the data being streamed to the memory. After the offset is added, the address generator hardware 110 clears the indicator bit back to prevent further gap insertion. When the bit indicator 117 is cleared (reset), the byte offset register 115 generates an interrupt 125 which is received by the host CPU indicating that the CPU may now remultiplex, i.e., insert, new data in the resulting gap 70 created in the memory 50. To accomplish this, as further shown in FIG. 3, the data unloader block is provisioned with an address capture block 120 which captures the address of the write pointer at the location corresponding to the beginning of the gap so that the CPU will know exactly where the information to be added is going to be in the bucket queue. The processor can then write new packets into the gap and forward the entire buffer to the hard drive, effectively remultiplexing the stream. A timer interrupt, as is included in an integrated Set-Top chip such as the STB03xxx design, may be set so that packets are inserted on a periodic basis throughout the stream. It should be understood that, in an alternate embodiment, the remultiplex function may be implemented without a bit indicator, in which case the CPU will initialize the byte offset value to zero, and write the particular byte off-set value when the gap in memory is to be inserted, and then after, insertion, re-set byte offset register value to zero. At such time the byte offset value is reset to zero, the byte offset register will generate the interrupt so that the CPU may begin writing data in the resulting gap formed in the memory queue.

According to the invention, the methodology for carrying out the transport demultiplxor queue remultiplexor function includes: a Step 1 of configuring the partial transport stream to be sent to memory, i.e., determining which packet Ids are going to be sent to the bucket queue. This may implement blocks to interrupt (BTI) interrupts which are system interrupts generated every predetermined number of bytes of data for a variety of purposes; a Step 2 of writing a value to the byte offset register indicating the number of bytes to be inserted into the memory and additionally tag the particular queue ID, e.g., the bucket queue where multiple packet Ids may be stored all together. It is understood that a bucket queue is applicable for storing packet remultiplexed packet data geared for recording personal transport streams. However, it should be understood that a bucket queue is not required, and a single queue memory storage may suffice. After the non-zero offset value is used by the data unloader, the offset value is reset to zero, and the interrupt is generated to indicate when processing may commence. In a Step 3, the interrupt is received by the host CPU which reads the captured address indicating where in the memory the data bytes are to be inserted. At Step 4, the CPU then that writes in the new data at that memory location. It is understood that rather than placing all the content at one location, the new data may be inserted at fixed intervals, e.g., every 10 microseconds. Thus, at a Step 5, an internal timer (not shown) may generate interrupts to add a predetermined amount of space in the memory. Thus, for example, if teletext data or closed captioning data is to be input for display at the bottom of the subscribers screen, it may be desirable to track it timewise for association with the way particular video data is playing out. It is beneficial that all these types of data (new data to be inserted) and audio and video data are mixed together and interleaved in the manner described, in order to reduce the risk of running out of audio or video data when displaying a large block of new data. Thus, steps 2, 3 and 4 may be repeated so that a large block of new data to be inserted may be spread across a wider span.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A transport stream demultiplexor comprising:
   a packet buffer for receiving data packets belonging to an input transport stream, each packet having a corresponding identifier identifying a program to which said packet belongs;
   a data unloader device for pulling successive packets from the packet buffer for storage in a memory storage device, and writing the pulled packets into contiguous address locations in the memory; and,
   a remultiplexor mechanism for generating a memory address offset comprising a number of bytes such that a next data packet pulled from the packet buffer to be stored in memory is offset from a last contiguous memory location assigned to a previously pulled packet by said number of bytes, said offset defining a memory gap in said memory storage device capable of being filled with new data content by a processor device.

2. The transport stream demultiplexor as claimed in claim 1, wherein a value of said address offset defining said memory gap is user programmable.

3. The transport stream demultiplexor as claimed in claim 1, wherein a value of said address offset for defining said memory gap corresponds to a number of bytes of data to be inserted in said input transport stream.

4. The transport stream demultiplexor as claimed in claim 1, wherein said input transport stream is a multiplexed stream having packet content associated with many programs, said memory storage device comprising a bucket queue for storing data packets having content associated with a single program.

5. The transport stream demultiplexor as claimed in claim 4, wherein said data packets having content associated with a single program comprises packets including audio, video and navigation data payload.

6. The transport stream demultiplexor as claimed in claim 1, implemented in a communications system comprising a host processor, said host processor initiating insertion of said new data content in said gap.

7. The transport stream demultiplexor as claimed in claim 6, further comprising mechanism for transporting content in said memory storage device to a fixed storage device for subsequent playback.

8. The transport stream demultiplexor as claimed in claim 6, wherein said data unloader device comprises an address generator device for generating sequential addresses in said memory where successive pulled data packets of a program are to be stored.

9. The transport stream demultiplexor as claimed in claim 8, wherein said remultiplexor mechanism comprises a byte offset device for receiving a non-zero offset value from said CPU in accordance with said number of bytes in memory to be inserted with new data, said address generator adding said non-zero offset value to a generated address for generating said memory address offset.

10. The transport stream demultiplexor as claimed in claim 9, wherein said byte offset device further includes bit indicator being set for indicating when said non zero offset value is to be added to a generated address, and is reset to prevent said address generator from adding said non-zero offset value to a generated address for gap insertion.

11. The transport stream demultiplexor as claimed in claim 10, further comprising address capture device for retaining an address value generated from said address generator device associated with a packet pulled prior to adding said address offset.

12. The transport stream demultiplexor as claimed in claim 11, wherein said byte offset device includes mechanism responsive to resetting of said bit indicator for generating interrupt for receipt by said CPU for indicating to said CPU that said defined gap in memory is ready to be filled with said new data content, said CPU utilizing said captured address for filling said memory gap.

13. The transport stream demultiplexor as claimed in claim 6, wherein said remultiplexor mechanism further includes timer mechanism for periodically creating gaps in said memory storage device for periodically inserting new data content.

14. In a transport demultiplexor device for separating transport stream content, a method for remultiplexing packets to be communicated in a separated transport stream, said method comprising:
   a) receiving data packets belonging to an input transport stream, each packet having a corresponding identifier identifying a program to which said packet belongs;
   b) pulling successive packets from the packet buffer for storage in a memory storage device, and writing the pulled packets into contiguous address locations in the memory; and,
   c) generating a memory address offset comprising a number of bytes such that a next data packet pulled from the packet buffer to be stored in memory is offset from a last contiguous memory location assigned to a previously pulled packet by said number of bytes, said offset defining a memory gap in said memory storage device capable of being filled with new data content by a processor device.

15. The method for remultiplexing packets as claimed in claim 14, wherein a value of said address offset for defining said memory gap corresponds to a number of bytes of data to be inserted in said input transport stream.

16. The method for remultiplexing packets as claimed in claim 14, wherein said input transport stream is a multiplexed stream having packet content associated with many programs, said memory storage device comprising a bucket queue for storing data packets having content associated with a single program.

17. The method for remultiplexing packets as claimed in claim 16, wherein said data packets having content associated with a single program comprises packets including audio, video and navigation data payload.

18. The method for remultiplexing packets as claimed in claim 14, wherein a host processor (CPU) device initiates insertion of said new data content in said gap.

19. The method for remultiplexing packets as claimed in claim 18, further comprising the step of: transporting content in said memory storage device to a fixed storage device for subsequent playback.

20. The method for remultiplexing packets as claimed in claim 18, wherein said pulling step b) comprises the step of generating sequential addresses corresponding to contiguous locations in said memory storage where successive pulled data packets of a program are to be stored.

21. The method for remultiplexing packets as claimed in claim 20, wherein said step c) of generating an address offset further includes the steps:
   receiving a non-zero offset value from said CPU in accordance with said number of bytes in memory to be inserted with new data; and, adding said non-zero offset value to a generated address for generating said memory address offset.

22. The method for remultiplexing packets as claimed in claim 21, further including the steps of:

receiving a bit indicator value for enabling said adding of said non-zero offset value with a generated address for generating said address offset, and, resetting said bit indicator value for preventing said adding of said non-zero offset value with a generated address for generating said memory address offset.

23. The method for remultiplexing packets as claimed in claim 21, further comprising the step of: capturing an address value associated with a packet pulled prior to adding said non-zero value offset.

24. The method for remultiplexing packets as claimed in claim 22, further including the step of: generating an interrupt for receipt by said CPU in response to resetting of said bit indicator value, said interrupt for indicating to said CPU that said defined gap is ready to be filled with said new data content, whereby said CPU utilizes said captured address value for filling said memory gap.

25. The method for remultiplexing packets as claimed in claim 18, further including the step of periodically creating gaps in said memory storage device for periodically inserting new data content.

* * * * *